United States Patent
Shin et al.

(10) Patent No.: US 10,133,278 B2
(45) Date of Patent: Nov. 20, 2018

(54) APPARATUS OF CONTROLLING MOVEMENT OF MOBILE ROBOT MOUNTED WITH WIDE ANGLE CAMERA AND METHOD THEREOF

(71) Applicant: YUJIN ROBOT CO., LTD., Seoul (KR)

(72) Inventors: Kyung Chul Shin, Seoul (KR); Seong Ju Park, Gunpo-si (KR); Min Chang, Seongnam-si (KR); Jae Young Lee, Gunpo-si (KR); Byung Kwon Moon, Seoul (KR)

(73) Assignee: Yujin Robot Co., Ltd., Incheon (KR)

( * ) Notice: Subject to any disclaimer, the term of this patent is extended or adjusted under 35 U.S.C. 154(b) by 20 days.

(21) Appl. No.: 15/379,501

(22) Filed: Dec. 15, 2016

(65) Prior Publication Data
US 2017/0153646 A1 Jun. 1, 2017

Related U.S. Application Data

(63) Continuation of application No. PCT/KR2015/006157, filed on Jun. 17, 2015.

(30) Foreign Application Priority Data

Jun. 17, 2014 (KR) .......................... 10-2014-007370

(51) Int. Cl.
*G05B 15/00* (2006.01)
*G05B 19/00* (2006.01)
(Continued)

(52) U.S. Cl.
CPC .......... *G05D 1/0246* (2013.01); *B25J 9/1697* (2013.01); *B25J 13/08* (2013.01);
(Continued)

(58) Field of Classification Search
CPC .... B25J 9/1697; G05D 1/0246; G05D 1/0272
(Continued)

(56) References Cited

U.S. PATENT DOCUMENTS

| 7,110,602 B2* | 9/2006 | Krause | G06K 9/0063 382/199 |
|---|---|---|---|
| 2015/0119086 A1* | 4/2015 | Mirowski | G01S 5/0252 455/456.6 |
| 2015/0206023 A1* | 7/2015 | Kochi | G01B 11/00 382/199 |

FOREIGN PATENT DOCUMENTS

| KR | 10-2003-0095492 A1 | 12/2003 |
|---|---|---|
| KR | 10-0834577 A1 | 6/2008 |

(Continued)

OTHER PUBLICATIONS

Ethan Eade and Tom Drummond, Edge landmarks in monocular SLAM, Image and Vision Computing, vol. 27, Issue 5, pp. 588-596, Apr. 2, 2009.
(Continued)

*Primary Examiner* — Harry Y Oh
(74) *Attorney, Agent, or Firm* — Jongkook Park

(57) ABSTRACT

Disclosed are an apparatus of controlling movement of a mobile robot mounted with a wide angle camera and a method thereof. An apparatus of recognizing a position of a mobile robot includes two wide angle cameras which obtain one pair of stereo images on a region of interest including a vertical direction and a horizontal direction in accordance with movement of a mobile robot; an inertial measurement unit (IMU) which obtains inertial information of a mobile robot; a position recognizing unit which predicts a movement point using one between first odometry information calculated based on at least one pair of stereo images and second odometry information calculated based on the inertial information and estimates a current position using the (Continued)

predicted movement point and a previously stored key frame, by a position recognizing unit; and a movement control unit which controls movement of the mobile robot based on the estimated position.

20 Claims, 11 Drawing Sheets

(51) Int. Cl.

| | | |
|---|---|---|
| G05D 1/02 | (2006.01) | |
| B25J 13/08 | (2006.01) | |
| B25J 9/16 | (2006.01) | |
| G01C 21/16 | (2006.01) | |
| G06K 9/00 | (2006.01) | |
| G06K 9/46 | (2006.01) | |
| G06T 7/73 | (2017.01) | |
| G06T 7/13 | (2017.01) | |
| H04N 13/239 | (2018.01) | |

(52) U.S. Cl.
CPC .......... *G01C 21/165* (2013.01); *G05D 1/027* (2013.01); *G05D 1/0251* (2013.01); *G05D 1/0253* (2013.01); *G05D 1/0272* (2013.01); *G05D 1/0274* (2013.01); *G06K 9/00664* (2013.01); *G06K 9/4604* (2013.01); *G06K 9/4647* (2013.01); *G06T 7/13* (2017.01); *G06T 7/74* (2017.01); *H04N 13/239* (2018.05); *G06K 9/00201* (2013.01); *G06T 2207/10021* (2013.01); *G06T 2207/20021* (2013.01); *G06T 2207/30244* (2013.01); *G06T 2207/30252* (2013.01); *Y10S 901/01* (2013.01)

(58) Field of Classification Search
USPC ........................................................ 700/259
See application file for complete search history.

(56) References Cited

FOREIGN PATENT DOCUMENTS

| | | | |
|---|---|---|---|
| KR | 10-2010-0081588 A1 | 7/2010 |
| KR | 10-2010-0119442 A1 | 11/2010 |
| KR | 10-2011-0011424 A1 | 2/2011 |
| KR | 10-2011-0047797 A1 | 5/2011 |
| KR | 10-2011-0097344 A1 | 8/2011 |
| KR | 10-2012-0070291 A1 | 6/2012 |
| KR | 10-2013-004674 A1 | 5/2013 |

OTHER PUBLICATIONS

John Canny, A Computational Approach to Edge Detection, IEEE Transactions on Pattern Analysis and Machine Intelligence, vol. PAMI-8, No. 6 pp. 679-698, Nov. 1986.

S. Benhimane and E. Malis, Homography-based 2D Visual Tracking and Servoing, International Journal of Robotics Research archive vol. 26 Issue 7 pp. 661-676, Jul. 2007.

Michael Calonder, Vincent Lepetit, Christoph Strecha, and Pascal Fua, BRIEF: Binary Robust Independent Elementary Features, vol. 6314 of the series Lecture Notes in Computer Science pp. 778-792, 11th European Conference on Computer Vision, Heraklion, Crete, Greece, Sep. 5-11, 2010.

Christoph Strecha, Vincent Lepetit, Tomasz Trzcinski, Michael Calonder, Mustafa Özuysal and Pascal Fua, BRIEF: Computing a local binary descriptor very fast, vol. 34 Issue No. 07, Jul. 2012.

Wooyeon Jeong and Kyoung Mu Lee, CV-SLAM: a new ceiling vision-based SLAM technique, IEEE International Conference on Intelligent Robots and Systems, Aug. 2-6, 2005.

Georg Klein and David Murray, Parallel Tracking and Mapping for Small AR Workspaces, IEEE and ACM International Symposium on Mixed and Augmented Reality, Nov. 13-16, 2007.

Woo Yeon Jeong and Kyoung Mu Lee, Visual SLAM with Line and Corner Features, Proceedings of the 2006 IEEE/RSJ International Conference on Intelligent Robots and Systems Beijing China pp. 2570-2575, Oct. 9-15, 2006.

* cited by examiner

[FIG. 1]
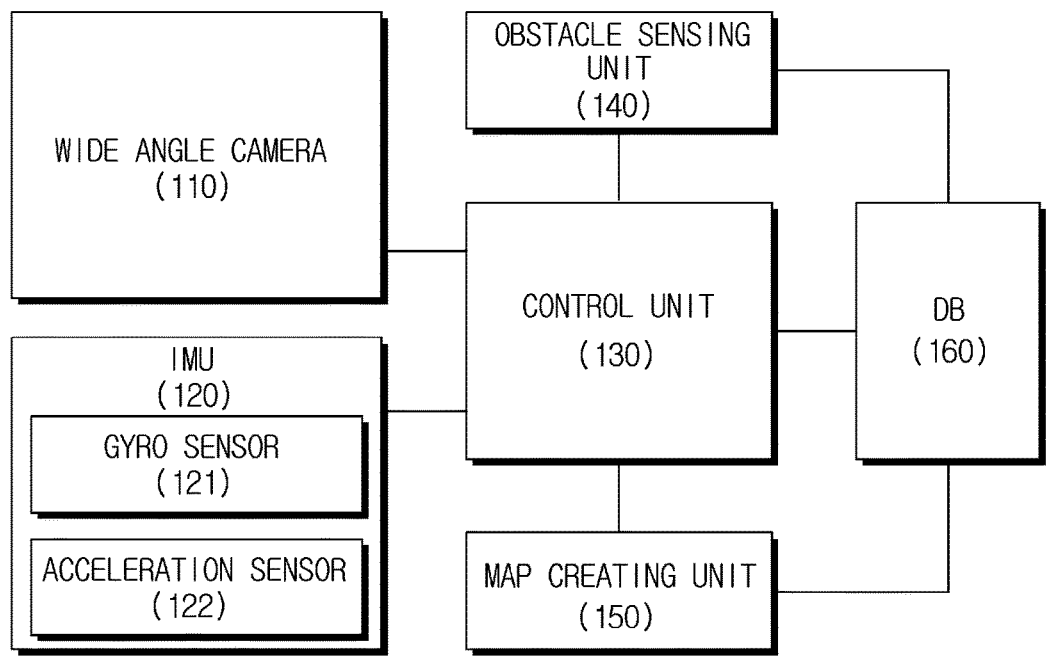

[FIG. 2]
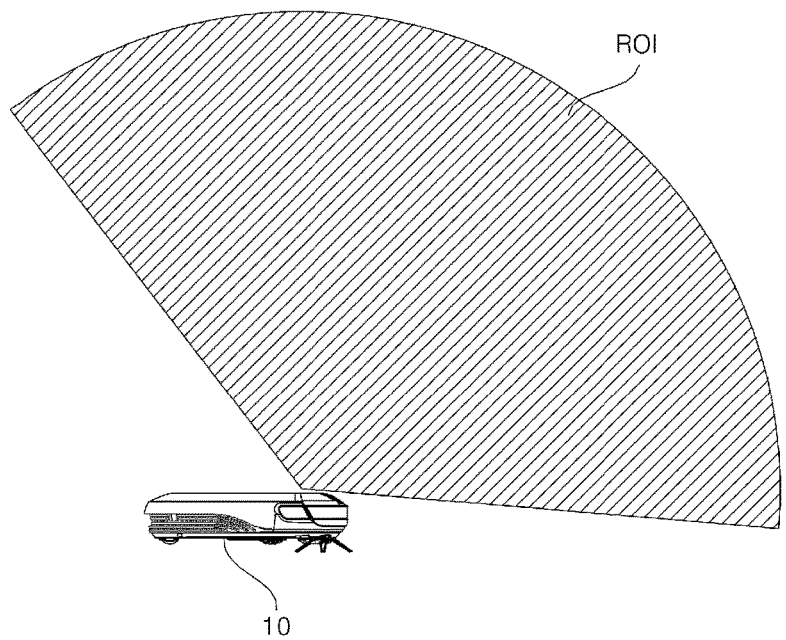
[FIG. 3]
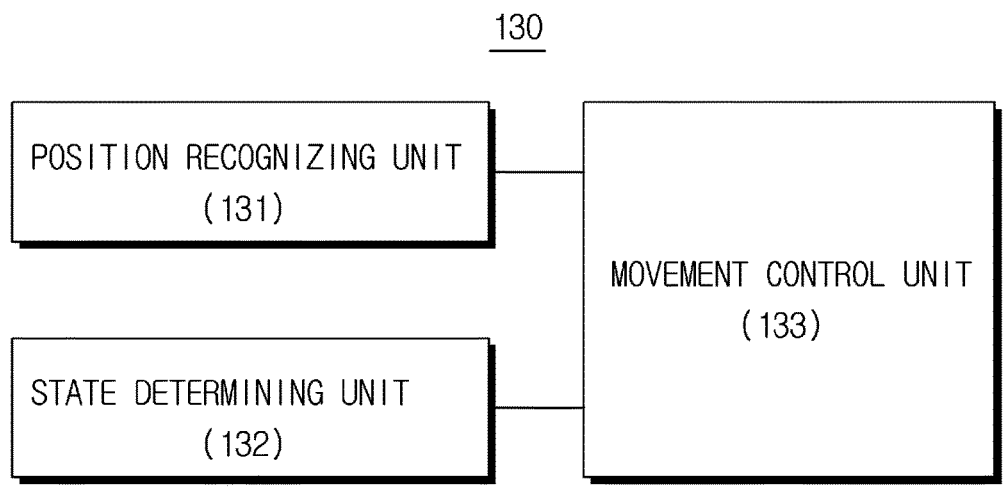

[FIG. 4A]
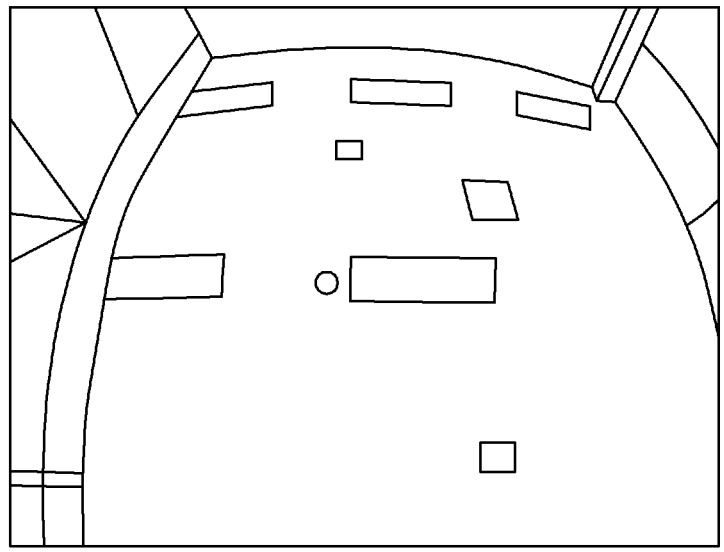
[FIG. 4B]
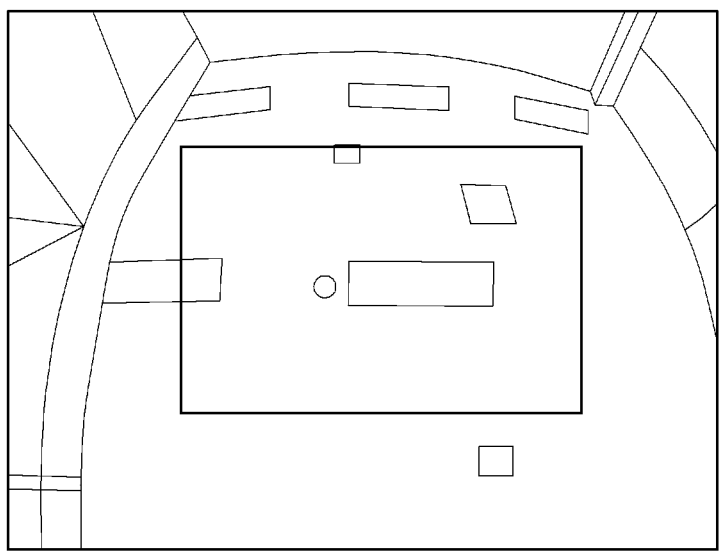
[FIG. 4C]
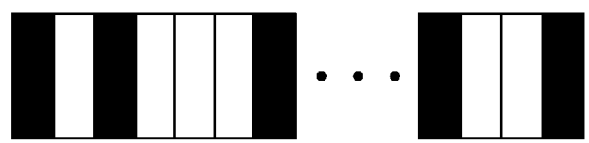

[FIG. 5]
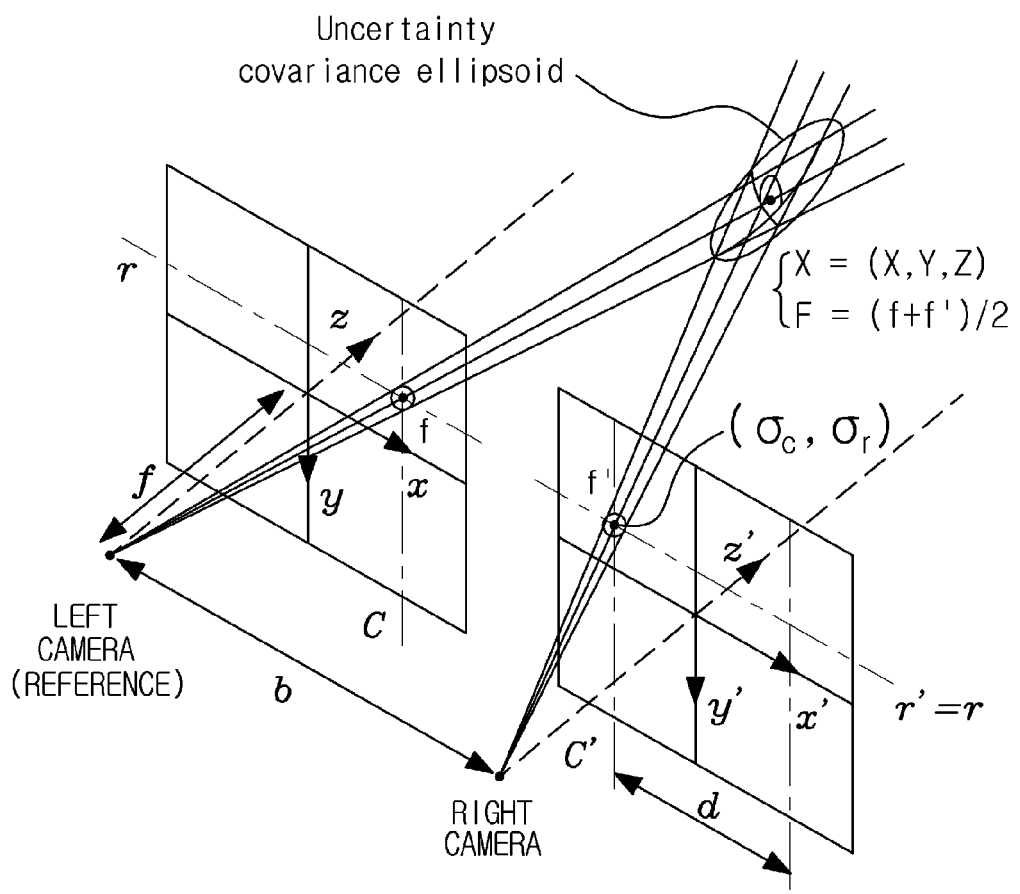

[FIG. 6A]
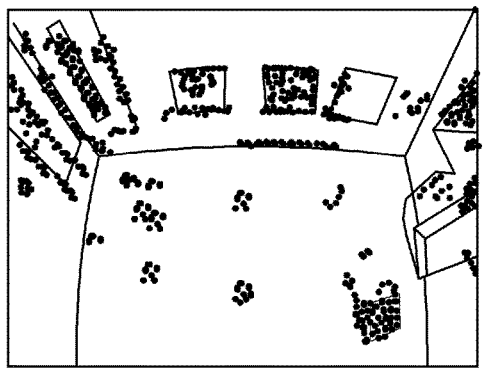
[FIG. 6B]
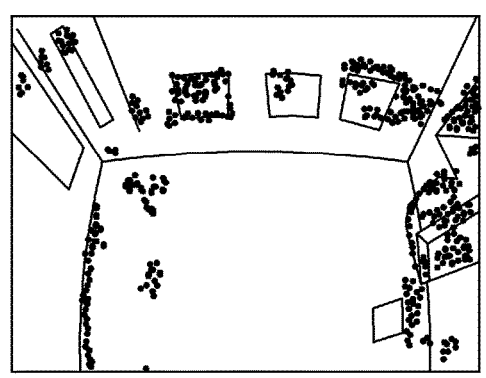
[FIG. 6C]
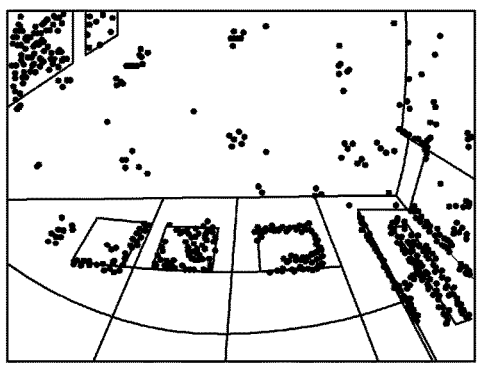
[FIG. 6D]
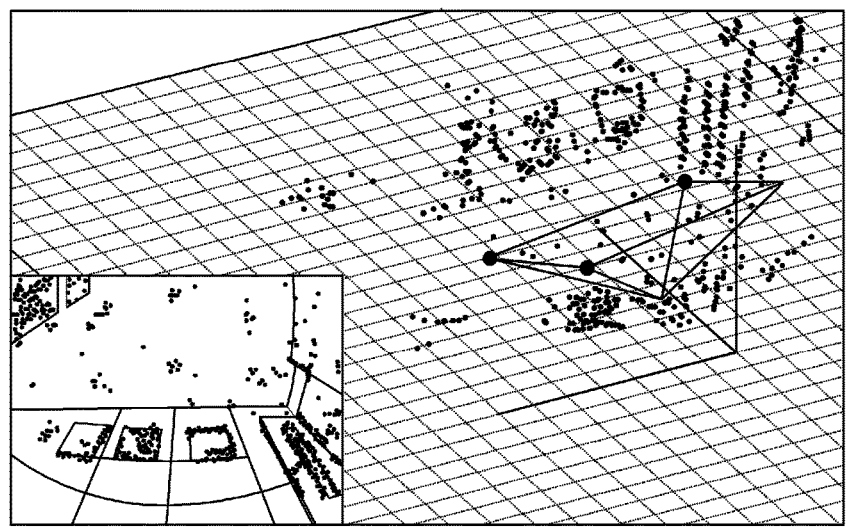

[FIG. 7]
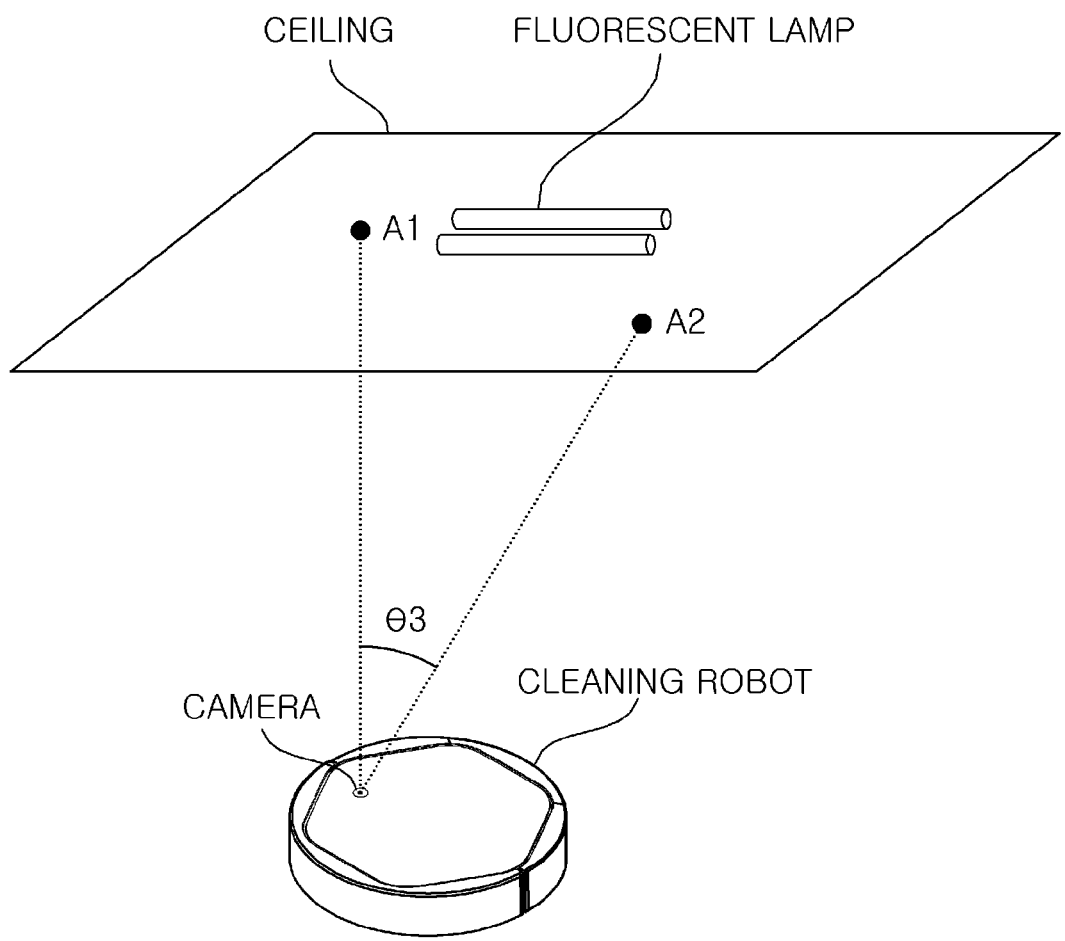

[FIG. 8]
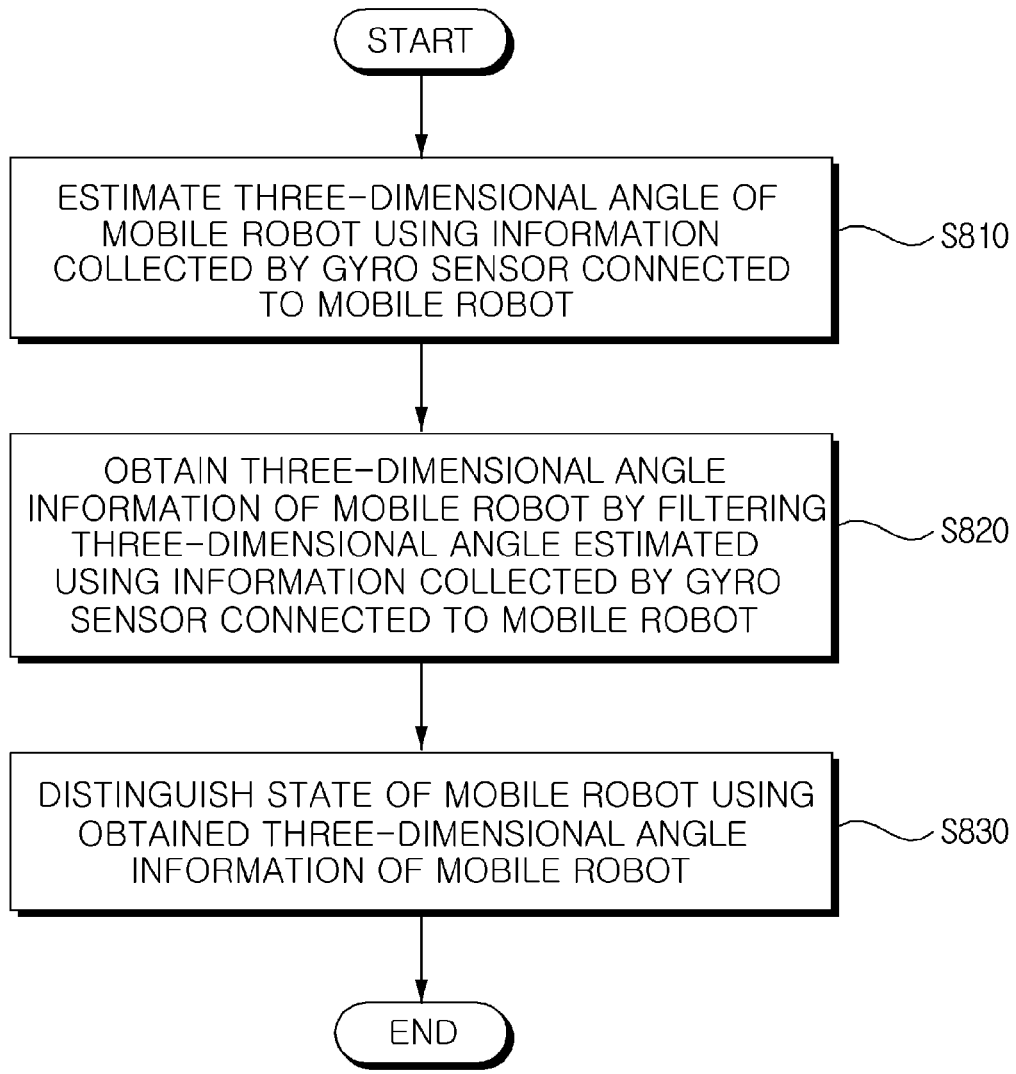

[FIG. 9]
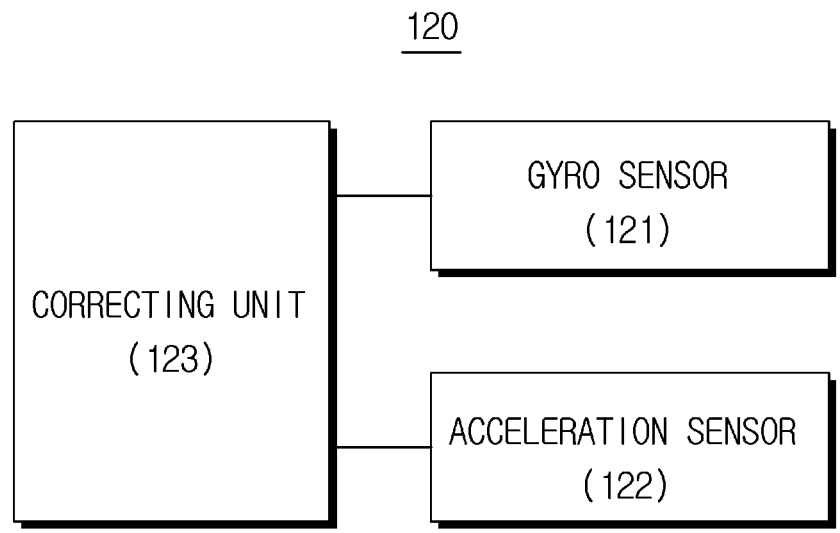
[FIG. 10]
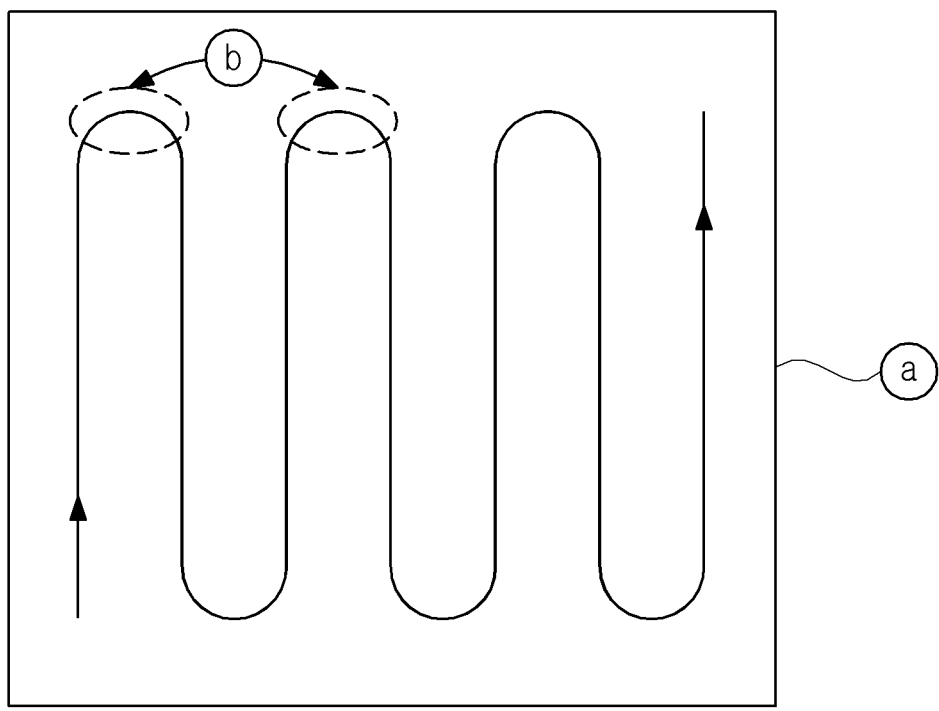

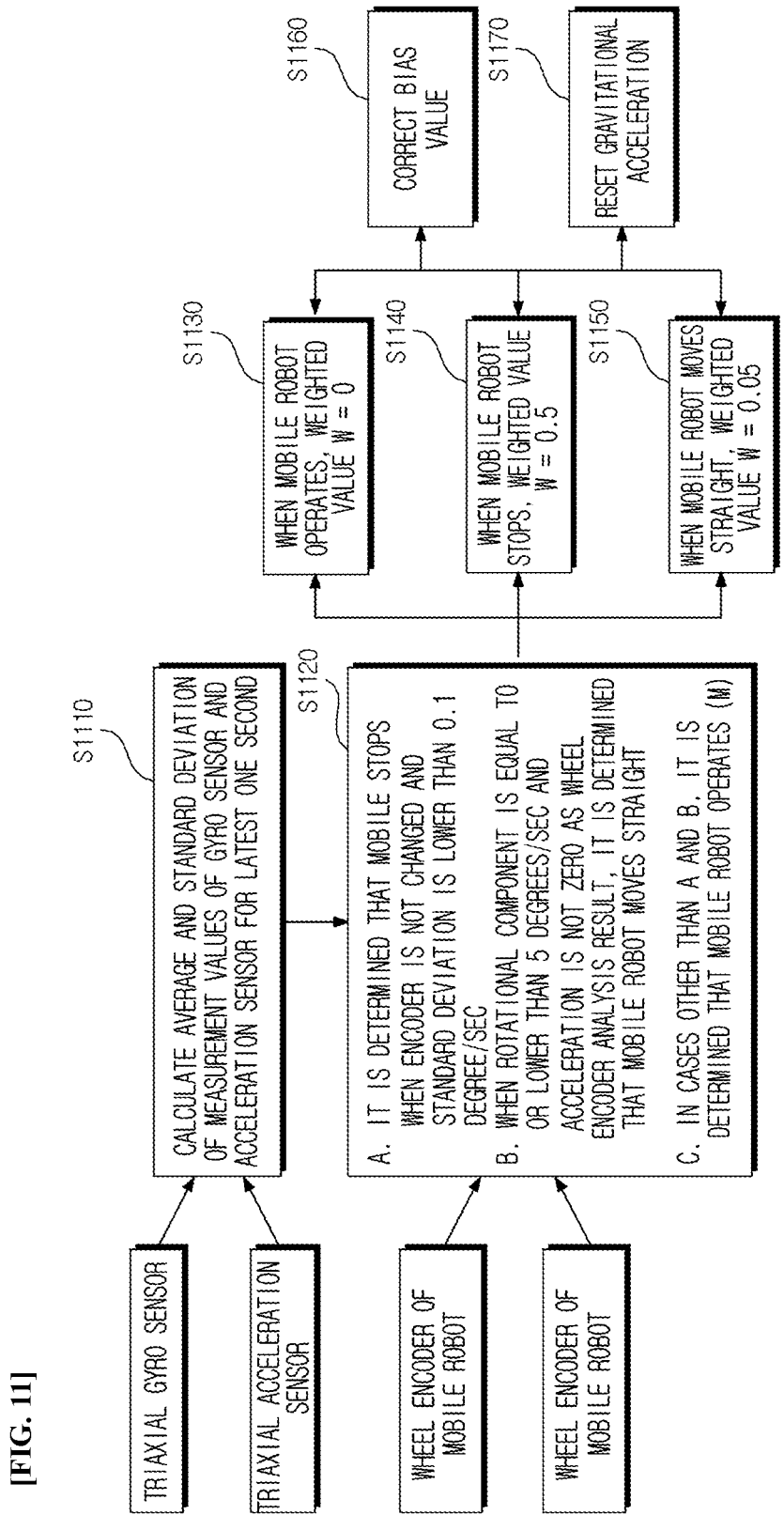
[FIG. 11]

[FIG. 12A]
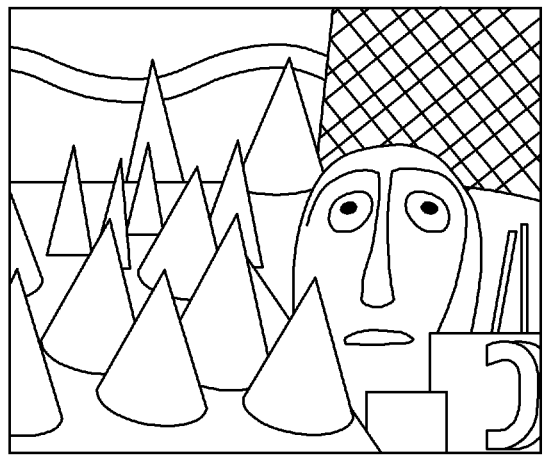
[FIG. 12B]
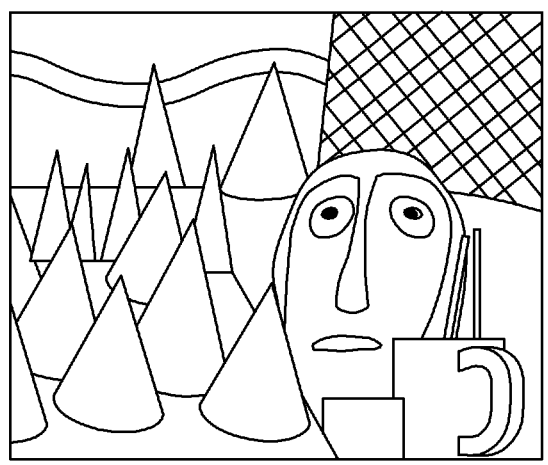
[FIG. 12C]
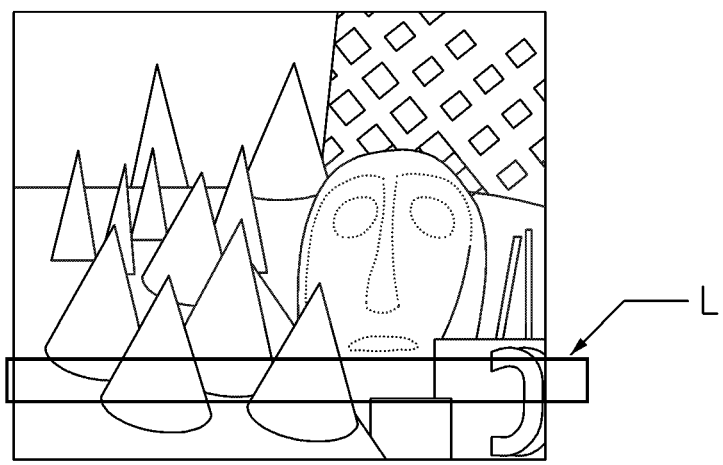

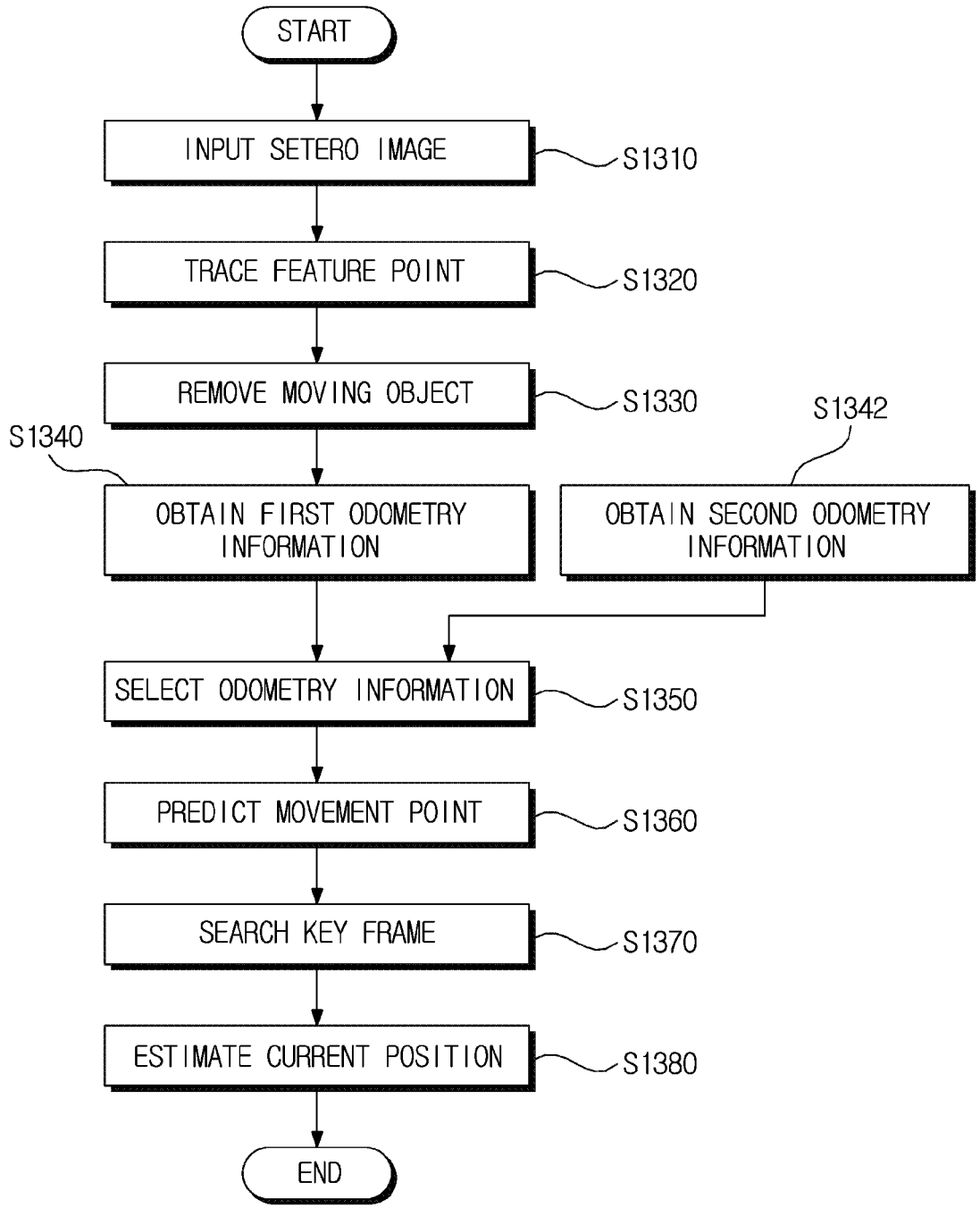
[FIG. 13]

APPARATUS OF CONTROLLING MOVEMENT OF MOBILE ROBOT MOUNTED WITH WIDE ANGLE CAMERA AND METHOD THEREOF

CROSS-REFERENCE TO RELATED APPLICATIONS

This application is a continuation of International Application No. PCT/KR2015/006157, filed on Jun. 17, 2015, which claims priority to and the benefit of Korean Patent Application No. 10-2014-0073708 filed in the Korean Intellectual Property Office on Jun. 17, 2014, both of which are hereby incorporated by reference in their entireties.

TECHNICAL FIELD

The present invention relates to a method and apparatus for controlling the movement of a mobile robot, and more particularly, to a method and apparatus for controlling the movement of a mobile robot that is mounted with a wide angle camera.

BACKGROUND

Recently, mobile robots that can autonomously set and move along their own routes have been developed. In order to allow the mobile robot to efficiently determine its position and move in a space, the mobile robot must generate a map of the space in which it is to move, and recognize its position within that space.

Mobile robots typically utilize a gyroscope and an encoder within the driving motor to move by dead reckoning, utilizing a map derived by analyzing video images taken by a camera installed on the upper portion of the robot. In this case, when an error occurs in the driving information from the gyroscope and the encoder, the image information obtained from the camera is utilized to correct the accumulated error.

However, such location-based mobile robots use a monocular camera or laser scanner under the assumption of movement on a two-dimensional plane. When this kind of monocular camera is used, however, it is difficult to know the distance to a feature point. Therefore, as the error of the dead reckoning navigation is increased, the problem arises that very many errors may be included in the position recognition results.

In addition, with the existing methods, in various situations, for example, when the mobile robot is confined in a tilted state during movement, when the mobile robot passes over a high threshold such as at a doorframe, or when the mobile robot moves onto the edge of a threshold or the edge of a carpet while using its monocular camera for SLAM (simultaneous localization and mapping), the posture of the mobile robot is not accurately estimated, making it difficult to control the mobile robot smoothly.

SUMMARY OF THE INVENTION

To solve the technical issues presented in the background, the present invention has been made in an effort to provide an apparatus for controlling the movement of a mobile robot mounted with a wide angle camera and a method thereof, in which the position is estimated based on one type of odometry information selected from between the odometry information for visual odometry, based on stereo imaging, and for internal odometry, based on inertial information.

The present invention has also been made in an effort to provide an apparatus for controlling movement of a mobile robot mounted with a wide angle camera which extracts a predetermined number of horizontal lines from a stereo image and performs dense stereo alignment along the extracted horizontal lines to obtain information on the distance to an obstacle, and a method thereof.

Further, the present invention has been made in an effort to provide an apparatus for controlling movement of a mobile robot mounted with a wide angle camera which estimates three-dimensional angle information using measured inertial information and uses the estimated three-dimensional information to determine the pose and operational state of the mobile robot, and a method thereof.

However, the object of the present invention is not limited to the above description, and additional objectives reported below will be apparent to those skilled in the art.

According to an aspect of the present invention, an apparatus of controlling the movement of a mobile robot includes an inertial measurement unit (IMU) which obtains inertial information of the mobile robot; a position recognition unit which predicts a movement point using one type of information selected from between the first odometry information, calculated based on at least one pair of stereo images obtained by the mobile robot, and the second odometry information, calculated based on the inertial information, and estimates the current position using the predicted movement point and a previously stored key frame; and a movement control unit which controls movement of the mobile robot based on the estimated position.

The apparatus may further include two wide angle cameras which obtain stereo images on a region of interest including a vertical direction and a horizontal direction in accordance with movement of the mobile robot, in which the position recognition unit reduces the received stereo images to have a predetermined size, encodes the reduced stereo images using a binary robust independent elementary features (BRIEF) binary descriptor to generate binary data as the encoding result, and compares the generated binary data and data indicating the absolute position of the mobile robot in the previously stored key frame to recognize the current position of the mobile robot with the absolute position as a result of the comparison.

In an exemplary embodiment of the present invention, the position recognition unit selects the first odometry information when the first odometry information satisfies the predetermined conditions and selects the second odometry information when the first odometry information does not satisfy the predetermined conditions.

In an exemplary embodiment of the present invention, the position recognition unit may search for at least one key frame adjacent to the movement point among a previously stored key frame set based on the predicted movement point, and estimates the current position of the mobile robot using at least one searched adjacent key frame.

In an exemplary embodiment of the present invention, the apparatus may further include an obstacle sensing unit, which extracts a predetermined number of horizontal lines in the received stereo image, and performs stereo alignment along the extracted horizontal lines to obtain distance information to an obstacle as the result.

In an exemplary embodiment of the present invention, the apparatus may further include a map creating unit which reconstructs a pose graph based on current position information of the mobile robot and updates the previously stored key frame set based on the reconstructed pose graph.

In an exemplary embodiment of the present invention, the apparatus may further include a state determining unit which obtains the three-dimensional angle of the mobile robot based on the inertial information and determines the state of the mobile robot using the obtained three-dimensional angle of the mobile robot, by which the movement control unit may control movement of the mobile robot based on the estimated position and the determined state.

In an exemplary embodiment of the present invention, when the obtained three-dimensional angle of the mobile robot is maintained at a specific angle for a predetermined time or longer, the state determining unit may determine that the mobile robot is in a state of being confined in a slope, and when the obtained three-dimensional angle of the mobile robot is equal to or greater than the predetermined angle or is changed more than a predetermined amount, it may determine that the mobile robot is in an overcoming state for crossing over an obstacle.

In an exemplary embodiment of the present invention, when a three-dimensional angle of the mobile robot obtained during the movement of the mobile robot has a gradient in a side direction, the state determining unit may determine this to be an error state in which an error is incurred in the position recognition of the mobile robot.

In an exemplary embodiment of the present invention, when the angular velocity measured by the gyro sensor during operation of the mobile robot is equal to or greater than a predetermined angular velocity, the IMU may calculate the average movement values of the mobile robot for each of the x, y, and z axes, and correct the bias value of the acceleration sensor based on the calculated average movement values of the x, y-axis, and z axes.

According to another aspect of the present invention, the method of controlling movement of a mobile robot includes: using two wide angle cameras to obtain one pair of stereo images for a region of interest including a vertical direction and a horizontal direction in accordance with the movement of the mobile robot; obtaining inertial information of the mobile robot with an inertial measurement unit (IMU); predicting the movement point using one type of information from between the first odometry information, calculated based on at least one pair of stereo images, and the second odometry information, calculated based on the inertial information, and estimating the current position using the predicted movement point and a previously stored key frame with a position recognizing unit; and controlling the movement of the mobile robot based on the estimated position using a movement control unit.

In an exemplary embodiment of the present invention, in the estimation process, the received stereo images may be reduced to have a predetermined size, the reduced stereo images may be encoded using a binary robust independent elementary features (BRIEF) binary descriptor to generate binary data as the encoding result, and the generated binary data may be compared with data indicating the absolute position of the mobile robot in the previously stored key frame, as a result allowing recognition of the current position of the mobile robot using the absolute position.

In an exemplary embodiment of the present invention, in the estimation process, the first odometry information may be selected when the first odometry information satisfies the predetermined conditions, and the second odometry information may be selected when the first odometry information does not satisfy the predetermined conditions.

In an exemplary embodiment of the present invention, in the estimation process, at least one key frame adjacent to the movement point may be searched from among a previously stored key frame set based on the predicted movement point, and the current position of the mobile robot may be estimated using at least one said searched adjacent key frame.

In an exemplary embodiment of the present invention, the method may further include extraction of a predetermined number of horizontal lines from the received stereo image and performance of stereo alignment along the extracted horizontal lines to obtain distance information to an obstacle as the result, using an obstacle sensing unit. In an exemplary embodiment of the present invention, the method may further include reconstructing a pose graph based on current position information of the mobile robot, and the previously stored key frame set may be updated based on the reconstructed pose graph by a map creating unit.

In an exemplary embodiment of the present invention, the method may further include obtaining a three-dimensional angle of the mobile robot based on the inertial information and determining the state of the mobile robot using the obtained three-dimensional angle of the mobile robot using a state determining unit, in which in the movement of the mobile robot may be controlled based on the estimated position and the determined state.

In an exemplary embodiment of the present invention, in the determination process, when the obtained three-dimensional angle of the mobile robot is maintained at a specific angle for a predetermined time or longer, it may be determined that the mobile robot is in a state of confinement, being confined in a slope, and when the obtained three-dimensional angle of the mobile robot is equal to or greater than the predetermined angle or is changed more than a predetermined change amount, it may be determined that the mobile robot is in an overcoming state for crossing over an obstacle.

In an exemplary embodiment of the present invention, in the determination process, when the three-dimensional angle of the mobile robot measured during the movement of the mobile robot has a gradient in a side direction, it may be determined to be an error state in which an error is incurred in the position recognition of the mobile robot.

In an exemplary embodiment of the present invention, in the obtaining of inertial information, when the angular velocity of the gyro sensor measured during operation of the mobile robot is equal to or greater than a predetermined angular velocity, the average movement values of the mobile robot may be calculated for the x-axis, y-axis, and z-axis, and the bias value of the acceleration sensor may be corrected based on the calculated average movement values of the x-axis, y-axis, and z-axis.

According to the present invention, the position is estimated based on one odometry information selected from between the visual odometry information calculated based on stereo imaging and the internal odometry information calculated based on inertial information, thereby reducing the positional error incurred when the mobile robot is tilted or slides.

Further, according to the present invention, the problem of vulnerability to positional error incurred when the mobile robot is tilted or slides is solved, so that the position may be recognized stably.

Further, according to the present invention, a predetermined number of horizontal lines is extracted from a stereo image to perform dense stereo alignment along the extracted horizontal lines, and as a result the distance information to an obstacle may be obtained, thereby allowing distance information to an obstacle to be obtained without attaching an expensive dedicated sensor for measuring distance.

In addition, according to the present invention, three-dimensional angle information is estimated using measured inertial information, and the estimated three dimensional angle information is used to determine the pose and operational state of a mobile robot, thereby enabling the accurate estimation of the tilting information of the mobile robot in three dimensions.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a view illustrating an apparatus for controlling the movement of a mobile robot according to an exemplary embodiment of the present invention.

FIG. 2 is a view illustrating a region of interest of the wide angle camera according to an exemplary embodiment of the present invention.

FIG. 3 is a diagram illustrating a detailed configuration of the control unit according to an exemplary embodiment of the present invention.

FIGS. 4A, 4B and 4C are views illustrating the space recognition process according to an exemplary embodiment of the present invention.

FIG. 5 is a view illustrating the uncertainty of a three-dimensional point according to an exemplary embodiment of the present invention.

FIGS. 6A, 6B, 6C and 6D are views illustrating the three-dimensional information of an edge according to an exemplary embodiment of the present invention.

FIG. 7 is a view illustrating the position recognition error incurred when the mobile robot is tilted.

FIG. 8 is a view illustrating the method of determining the state of the mobile robot according to an exemplary embodiment of the present invention.

FIG. 9 is a view illustrating a detailed configuration of an IMU according to another exemplary embodiment of the present invention.

FIG. 10 is a view illustrating an example in which a cleaning robot is intentionally set to stop during operation of said robot.

FIG. 11 is a view illustrating the bias correction process according to an exemplary embodiment of the present invention.

FIGS. 12A, 12B and 12C are views illustrating the obstacle sensing process according to an exemplary embodiment of the present invention.

FIG. 13 is a view illustrating the method for recognizing the position of a mobile robot according to an exemplary embodiment of the present invention.

It should be understood that the appended drawings are not necessarily to scale, and present a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an apparatus for recognizing the position of a mobile robot mounted with a wide angle camera using direct tracking and a method thereof, according to an exemplary embodiment of the present invention, will be described with reference to the accompanying drawings. The detailed explanation provided herein will be centered on parts which are required to understand the operation and effects of the present invention.

In the description of components of an exemplary embodiment, a component having the same name may be denoted by a different reference numeral in some drawings, but may also be denoted by the same reference numeral in other different drawings. However, even in this case, it does not mean that the applicable component has different functions depending on the exemplary embodiment or that the components have the same function in the different exemplary embodiments, but rather the function of each component shall be determined based on the description of the components in the corresponding exemplary embodiment.

Further, the present invention suggests a new position recognition method which estimates position based on one type of odometry information selected from between the odometry information calculated by visual odometry, based on stereo imaging, and odometry information calculated by internal odometry, based on inertial information, and extracts a predetermined number of horizontal lines from a stereo image to perform dense stereo alignment along the extracted horizontal lines to obtain distance information to an obstacle as a result.

FIG. 1 is a view illustrating an apparatus for controlling the movement of a mobile robot according to an exemplary embodiment of the present invention.

As illustrated in FIG. 1, the mobile robot position recognition apparatus according to an exemplary embodiment of the present invention includes a camera 110, an inertial measurement unit (IMU) 120, a control unit 130, an obstacle sensing unit 140, a map creating unit 150, and a database (DB) 160.

Two cameras 110 may be provided to obtain a pair of stereo images, that is, a left image and a right image. Here, two cameras indicates that two different lenses are used to obtain an image from two different viewpoints. Further, the case in which two lenses are provided in one image obtaining device to obtain two images is also included in the scope of this invention. In this case, the camera 110 may be mounted to have a predetermined area of interest. Here, the region of interest may be a region to be photographed using the camera 110 provided with the mobile robot.

The camera 110 may desirably be a wide angle camera. A wide angle camera is a camera which can take images using a wide angle lens having an angle of view which is wider than that of a general camera lens. It is desirable to use a wide angle camera for the mobile robot to obtain a broader image of the surrounding area. For example, the wide angle camera may be a camera using a fisheye lens. Here, the angle of view of the wide angle lens in the wide angle camera may be 60 to 270 degrees. The wide angle camera for the present invention is not limited to the range of angle of view in the above-described example, and cameras using lenses having various ranges of angles of view may also be used.

FIG. 2 is a view illustrating a region of interest of the wide angle camera according to an exemplary embodiment of the present invention.

As illustrated in FIG. 2, according to the exemplary embodiment of the present invention, unlike existing mobile robots in which the camera is directed either toward the ceiling or the front side, the two cameras 110 mounted on the mobile robot 10 in the present invention employ wide angle lenses which can see both the ceiling and the front side, so that both the ceiling and the front side may be set as regions of interest (ROI).

For example, the camera may shoot images of regions in both a horizontal direction and a vertical direction using the wide angle lens.

According to the exemplary embodiment of the present invention, both the ceiling and the front side are set as the regions of interest using the camera 110 mounted as described above, so that the feature points may be easily secured. Further, the position may now be recognized even in places where it is difficult to find feature points, and obstacles located at the front side of the robot may also now be recognized.

The IMU 120 measures inertial information of the mobile robot, for example, information such as the position, posture, and the like. The IMU 120 may include a gyro sensor 121 and an acceleration sensor 122.

The gyro sensor 121 collects angular velocity information of the mobile robot.

The mobile robot, according to the exemplary embodiment of the present invention, utilizes three-dimensional angle information in order to distinguish the pose or operational state of the mobile robot, and the pose and operational state information is in turn used in controlling the mobile robot, so that the gyro sensor 121 is desirably a triaxial sensor.

That is, the gyro sensor 121 may collect angular velocity information for three axes including the x-axis, y-axis, and z-axis.

The angular velocities of three axes, including the x-axis, y-axis, and z-axis, which are detected by the triaxial gyro sensor 121 are respectively referred to as the roll, pitch, and yaw.

Specifically, rotation around the x-axis of the mobile robot is called the roll, rotation around the y-axis of the mobile robot is called the pitch, and rotation around the z-axis of the mobile robot is called the yaw.

The three-dimensional angle information to be obtained in the exemplary embodiment of the present invention is the roll, pitch, and yaw.

The acceleration sensor 122 measures both gravitational acceleration and acceleration in accordance with the movement of the mobile robot.

As in the case of the gyro sensor 121, it is desirable that the acceleration sensor 122 be a triaxial sensor.

That is, the acceleration sensor 122 may collect the acceleration information of three axes including the x-axis, y-axis, and z-axis.

The control unit 130 estimates the position, pose, and state based on the stereo image input from the wide angle camera 110 and the inertial information input from the IMU 120, and controls the movement of the mobile robot based on the estimated position, pose, and state.

FIG. 3 is a diagram illustrating the detailed configuration of the control unit, according to an exemplary embodiment of the present invention.

As illustrated in FIG. 3, the control unit 130, according to the exemplary embodiment of the present invention, may include a position recognition unit 131 which recognizes the position, a state determining unit 132 which judges the pose and state, and a movement control unit 133 which controls the movement. The position recognition unit 131 receives stereo image input from the wide angle camera 110 and recognizes a given space based on the received stereo image input whenever the mobile robot moves a predetermined distance.

FIG. 4 is a view illustrating the space recognition process according to an exemplary embodiment of the present invention.

As illustrated in FIG. 4, whenever the mobile robot moves a predetermined distance or whenever a new key frame is generated, the position recognizing unit 131 recognizes the given space to create a database thereof.

The position recognition unit 131 reduces the received stereo image input to be of a preconfigured size so that it can be blurred. Here, it is desirable that the preconfigured size may be one eighth of the received stereo image input. Referring to FIG. 4, the position recognizing unit 131 may reduce the received stereo image input (a) and generate a blurred image (b).

The position recognizing unit 131 encodes the blurred stereo image using a binary robust independent elementary features (BRIEF) binary descriptor so that binary data may be generated as the result of encoding. Here, the binary data may be generated to be 32 bytes in size. Here, the BRIEF binary descriptor may be encoded using the method introduced in {BRIEF}: Computing a Local Binary Descriptor Very Fast, M. Calonder, V. Lepetit, M. Ozuysal, T. Trzcinski, C. Strecha, and P. Fua IEEE Transactions on Pattern Analysis and Machine Intelligence 2012. Here, the binary data may be generated to be 32 bytes in size, for example. FIG. 4C is a reference view illustrating the BRIEF binary descriptor as described above.

The position recognizing unit 131 compares the binary data generated as described above to the data indicating the absolute position of the mobile robot in the previously stored key frame, and as a result of comparison, may recognize the current position using the absolute position when the absolute position falls within a predetermined range.

The reason why the BRIEF binary descriptor is used to recognize a space in the present invention is because the calculation speed is much faster than that of established descriptors which are used in the related art, such as SIFT or SURF.

The position recognizing unit 131 receives stereo image input from the wide angle camera 110 to obtain the first type of odometry information through visual odometry based on the input stereo image, and receives inertial information from the IMU 120 to obtain the second type of odometry information through internal odometry based on the input inertial information. The odometry information to be obtained by the present invention includes a movement distance and a movement angle. Here, the movement angle refers to an angle with respect to a predetermined direction.

In this case, the position recognizing unit 131 extracts a feature point from the stereo image to trace the extracted feature point, and then uses the traced feature point to obtain the odometry information. The position recognizing unit 131 uses one of the pair of obtained stereo images, generally the left stereo image.

Generally, the feature point which is extracted during the preprocessing process is a corner. However, it is impossible to obtain a sufficient amount of feature points in regions where there is no texture, such as in a hallway or a large office space.

In order to solve the above-mentioned problem, the position recognizing unit 131 performs stereo matching for the edges. That is, the position recognizing unit 131 extracts an edge from the stereo image and performs sparse stereo matching on the extracted edge.

FIG. 5 is a view illustrating the uncertainty of a three-dimensional point according to an exemplary embodiment of the present invention.

As illustrated in FIG. 5, the position recognizing unit 131 sets the uncertainty σ according to a depth value obtained through the results of stereo matching and stores the uncertainty σ in the DB. In the case of a wide angle camera, the focal length is very short, causing the resolution to be low. Therefore, because the reliability of the obtained depth value drops, an update is performed later.

The uncertainty of the three-dimensional point obtained using two wide angle cameras is represented by Equation 1.

$$\Sigma = \begin{pmatrix} \sigma_X^2 & \sigma_{XY} & \sigma_{XZ} \\ \sigma_{XY} & \sigma_Y^2 & \sigma_{YZ} \\ \sigma_{XY} & \sigma_{YZ} & \sigma_Z^2 \end{pmatrix}$$

$$= \begin{pmatrix} \frac{b^2\sigma_c^2}{d^2} + \frac{b^2(c-c_0)\sigma_d^2}{d^4} & \frac{(c-c_0)b^2\sigma_d^2(r-r_0)}{d^4} & \frac{(c-c_0)b^2\sigma_d^2 f}{d^4} \\ \frac{(c-c_0)b^2\sigma_d^2(r-r_0)}{d^4} & \frac{b^2\sigma_r^2}{d^2} + \frac{b^2(r-r_0)\sigma_d^2}{d^4} & \frac{(r-r_0)b^2\sigma_d^2 f}{d^4} \\ \frac{(c-c_0)b^2\sigma_d^2 f}{d^4} & \frac{(r-r_0)b^2\sigma_d^2 f}{d^4} & \frac{f^2 b^2 \sigma_d^2}{d^4} \end{pmatrix}$$

[Equation 1]

Here, $$\begin{pmatrix} \sigma_X^2 & \sigma_{XY} & \sigma_{XZ} \\ \sigma_{XY} & \sigma_Y^2 & \sigma_{YZ} \\ \sigma_{XY} & \sigma_{YZ} & \sigma_Z^2 \end{pmatrix}$$

indicates the uncertainty covariance ellipsoid, b indicates the distance between the cameras, x, y, and z indicate the coordinate system of the left imaging camera, x', y', and z' indicate the coordinate system of the right imaging camera, (c, r) and (c', r') indicate the coordinates of pixels which match each other from the left and right imaging cameras, respectively, f and f' indicate the focal distances of the left and right imaging cameras, respectively, $\sigma_r$ and $\sigma_c$ represent the uncertainty when the feature point is extracted as axes, and $r_0$ and $c_0$ represent the optical axes of the camera by a camera coordinate system. Further, d is the difference value generated when the feature point is projected to the left side and the right side, which is generally referred to as disparity. $\sigma_d$ represents uncertainty of the measured depth value.

At a time when it is determined that the mobile robot has moved a predetermined distance, pixels which are stored in the key frame are projected onto the current image to find the most similar pixel and update the depth value. The update may be performed by applying a general Bayesian rule.

In this case, while the mobile robot is in motion, erroneous information is input due to various variables, particularly, moving obstacles or blocking, thus there may exist outliers among depth values obtained based on erroneous information.

In order to solve the above-mentioned problem, when the obtained depth value is within 1Σ, the variable "no_success" is increased by one, and when the obtained depth value is larger than 1Σ, the variable "no_failure" is increased by one. Thereafter, only when the reliability no_success/(no_success+no_failure) is larger than a specific value is the depth value used to recognize the position.

The Bayesian rule which is used to update the depth value is represented by Equation 2.

$$\mu = [\sigma_{z_2}^2/(\sigma_{z_1}^2 + \sigma_{z_2}^2)]\mu_{Z_1} + [\sigma_{z_1}^2/(\sigma_{z_1}^2 + \sigma_{z_2}^2)]\mu_{Z_2}$$

$$1/\sigma^2 = (1/\sigma_{z_1}^2) + (1/\sigma_{z_2}^2)$$ [Equation 2]

μ is the average of depth values, $\mu_{z1}$ is the average of the previously obtained depth values, $\mu_{z2}$ is the average of the currently measured depth values, σ is the uncertainty of μ, $\sigma_{z1}$ is the uncertainty of $\mu_{z1}$, and $\sigma_{z2}$ is the uncertainty of $\mu_{z2}$.

Here, although the update process of the depth value z has been described, the x and y values vary depending on z. Therefore, x, y, and z are all updated so that the position may be determined, and the updated x, y, and z are used so that the position of the camera may inversely be determined.

FIG. 6 is a view illustrating the three-dimensional information of an edge, according to an exemplary embodiment of the present invention. FIG. 6A is an image representing a depth value which is projected to the left imaging camera, FIG. 6B is an image representing a depth value which is projected to the right imaging camera, FIG. 6C is an image representing a depth value obtained through the updating process, and FIG. 6D is an image representing projection to a matching point and a depth value.

As illustrated in FIG. 6, it is understood that when the depth value is repeatedly updated, the three-dimensional information on the edge may be consistently obtained.

The information from the IMU is very important in situations where it is difficult to recognize the environment through the camera. However, in low-priced IMUs, bias varies significantly, or estimation of the bias is very difficult. In order to solve said problem, the bias is obtained by stopping the robot for a moment and taking an average. In this case, however, there are disadvantages in that the user may not only think that the mobile robot is unintelligent, but the working speed is also lowered.

In order to solve the above-mentioned problems, the position recognizing unit 131 updates the bias even during movement.

It is assumed that $\theta_g$ is the angular velocity obtained by a gyro sensor and $\theta_c$ is the angular velocity obtained by wide angle stereo vision. Error may be incurred between these angular velocities due to bias while the mobile robot is in motion. The error $\theta_e$ may be defined by Equation 3.

$$\theta_e = \theta_g - \theta_c$$ [Equation 3]

In this case, $\theta_e$ may be a bias. When speedy rotation or disturbance occurs, the bias is updated by applying the Bayesian rule as represented by Equation 4.

If, $|\theta| < \text{threshold}_{moving}$, $\mu_n = \theta_e$, $\sigma^2 = 1$ deg/sec×0.1 deg/sec [Equation 4]

$\mu_n$ indicates the error of the bias and σ indicates the uncertainty of $\mu_n$. When the mobile robot may stop during movement, the bias is updated as represented by Equation 5.

If, $|\theta| < \text{threshold}_{stop}$, $\mu_n = \theta_e$, $\sigma^2 = 0.1$ deg/sec×0.1 deg/sec [Equation 5]

Since the bias is corrected in real time by the above-described update process, even when the camera cannot be used momentarily, the odometry information obtained through use of the IMU may maintain a predetermined level of accuracy by always using the optimal bias.

The position recognizing unit 131 selects either the first type of odometry information or the second type of odometry information and uses the selected information as a basis for estimating the current state information, for example, the pose or position. That is, the position recognizing unit 131 accumulates the odometry information which is periodically measured during movement, specifically, the movement distance and the movement angle, to predict the relative position and angle from the movement point, that is, from the point at which movement starts.

The position recognizing unit 131 may predict the current position using a preset number of adjacent key frames from among the previously stored key frame set based on the state information estimated as described above. That is, the position recognizing unit 131 estimates the current position using at least one key frame adjacent to the predicted movement point. Here, the key frame may include the periodically estimated state information of the mobile robot.

The state determining unit 132 may estimate the three-dimensional angle information of the mobile robot using the angular velocity information of the three axes collected by the gyro sensor 121.

For example, the state determining unit 132 integrates the x-axis angular velocity, y-axis angular velocity, and z-axis angular velocity obtained from the gyro sensor 121 to estimate the three-dimensional angle information of the mobile robot using the integration results.

However, the three-dimensional angle information which is estimated by the state determining unit 132 using the information collected from the gyro sensor 121 contains a high quantity of noise and various error components. That is, it is highly likely that the estimated three-dimensional angle information may not be accurate due to the drift of the gyro sensor 121.

Therefore, the state determining unit 132 filters the three-dimensional angle information estimated using the acceleration information of the three axes collected by the acceleration sensor 122 to obtain a three-dimensional angle which is applicable to the mobile robot.

Specifically, since gravitational acceleration is generally significantly larger than the acceleration by movement, in the acceleration information collected by the acceleration sensor 122, the direction of acceleration obtained using the output of the acceleration sensor 122 may be the direction of gravitational acceleration. That is, when the information collected by the acceleration sensor 122 is used, the angle may be easily estimated.

However, it may be impossible to estimate the angle using the information collected by the acceleration sensor 122 in the case that the noise due to motion of the mobile robot is significant or when an external force such as collision is present, during which the transmitted momentary impact is equal to or greater than the gravitational acceleration.

Therefore, the state determining unit 132 may correct the three-dimensional angle information of the mobile robot estimated using the acceleration information collected by the gyro sensor 121 through use of the acceleration information collected by the acceleration sensor 122.

Specifically, the state determining unit 132 corrects drift problems which cause inaccuracy in the three-dimensional angle information estimated using the information collected by the gyro sensor 121 by using the value of the acceleration sensor 122 when the mobile robot is stopped, or when the motion of the mobile robot is uniform.

Further, in moments when the information from the acceleration sensor 122 contains a large amount of noise, the state determining unit 132 integrates the output of the gyro sensor 121 to obtain three-dimensional information as a result of the integration.

That is, the state determining unit 132 appropriately combines the information collected by the triaxial gyro sensor 121 and the triaxial acceleration sensor 122 to obtain angles in the x, y, and z axes. When the state determining unit 132 appropriately combines the information collected by the gyro sensor 121 and acceleration sensor 122, whichever sensor type will be given a specific weighted value in any case can be preconfigured. When the state determining unit 132 sets the weighted value to perform filtering in order to appropriately combine the information, a Kalman filter may be used.

Further, the state determining unit 132 repeatedly performs the processes of estimating the three-dimensional angle of the mobile robot using the information collected by the gyro sensor 121 and filtering the three-dimensional angle using the information collected by the acceleration sensor 122, allowing improvement in the accuracy of the obtained three-dimensional angle information.

The state determining unit 132 utilizes the previously obtained three-dimensional angle information of the mobile robot to determine the mobile robot's pose, operational state and movement state, as well as to determine whether the positional recognition requires correction.

The movement control unit 133 controls the mobile robot based on the position estimated by the position recognizing unit 131 and the state of the mobile robot determined by the state determining unit 132.

For example, when the obtained three-dimensional angle of the mobile robot is consistently maintained at a specific angle, the movement control unit 133 determines that the mobile robot is confined in a slope.

In the case of a cleaning robot, which is an example of a mobile robot, when the cleaning robot becomes stuck at a location during movement, such as on a fan or a high door threshold, the wheels of the cleaning robot spin without traction. When the wheels spin with no traction, the cleaning robot may easily lose track of its location. When the cleaning robot is stuck at a location such as on a fan or high threshold, the previously obtained three-dimensional angle of the cleaning robot may be higher than that in a normal movement state. When the previously obtained three-dimensional angle of the cleaning robot is higher than a predetermined angle, θ1, and this state is maintained for a predetermined time, T1, or longer, the state determining unit 132 may estimate that the cleaning robot is confined in a location such as on a fan or a high threshold. The predetermined angle θ1 may be set to be 8 degrees, and the predetermined time T1 may be set to be 0.5 seconds. The predetermined angle (θ1) or the predetermined time (T1) may vary depending on the type or characteristic of the cleaning robot, the user settings, or the system environment. Further, although the cleaning robot is exemplified, all mobile robots which may become confined by being stuck in a location such as a high threshold are applicable.

When it is estimated that the mobile robot is confined in a slope, the movement control unit 133 may perform an operation to escape the confinement of the slope. In this case, the operation performed by the movement control unit 133 to escape the confinement of the slope may be configured in advance, or an existing published method of escaping from the confinement of the slope may be used.

Further, when the three-dimensional angle of the mobile robot is changed sharply or is equal to or greater than a predetermined angle, $\theta 2$, the state determining unit 132 may determine that the mobile robot is in the state of crossing over an obstacle such as a threshold.

To use cleaning robots as an example, many cleaning robots include a floor sensor which measures the distance between the cleaning robot and the floor. When the distance measured by the floor sensor is equal to or greater than a predetermined distance, L1, the cleaning robot recognizes that there is a precipice in the direction of travel, and performs an avoidance operation such as moving in reverse or changing direction. The predetermined distance (L1) is set to be approximately 4 cm, but it may vary depending on factors such as the appearance of the cleaning robot, the characteristics of the cleaning robot, or the performance of the cleaning robot. Further, there exists a problem in that the predetermined distance (L1) may not be set to be too low, since part of the cleaning robot may be lifted in the process of crossing over a threshold.

Even when the distance measured by the floor sensor is equal to or greater than the predetermined distance L1, when the predetermined three-dimensional gradient of the cleaning robot is equal to or greater than the predetermined angle $\theta 2$, the state determining unit 132 may determine that the cleaning robot is in the state of crossing over an obstacle such as a threshold.

That is, the state determining unit 132 considers that there is not a precipice in the direction of travel of the cleaning robot, but that the value measured by the floor sensor is increased due to a front part of the cleaning robot being lifted to cross over an obstacle such as a threshold, and the state determining unit 132 estimates that the cleaning robot is in the state of crossing over an obstacle such as a threshold. The preconfigured angle ($\theta 2$) may vary depending on the appearance of the cleaning robot, the characteristics of the cleaning robot, the threshold-overcoming ability of the cleaning robot, and the characteristics of the cleaning space, and may be set to be approximately 8 degrees.

Similarly, even when the three-dimensional angle of the mobile robot is sharply changed, the state determining unit 132 may determine that the cleaning robot is in the state of crossing over an obstacle such as a threshold. How much the three-dimensional angle is quickly changed may be preconfigured, but may vary depending on the appearance of the cleaning robot, the characteristics of the cleaning robot, the threshold-overcoming ability of the cleaning robot, and the characteristics of the cleaning space.

When it is classified that the cleaning robot is in the state of crossing over an obstacle such as a threshold, even when the value measured by the floor sensor exceeds the reference value which determines whether there is a precipice, the movement control unit 133 may ignore the information from the floor sensor for a moment so as not to perform the cliff avoidance operation, but to control the cleaning robot so that it can cross over the obstacle such as a threshold. The momentary time (T2) may be configured to be approximately 0.5 seconds, but may vary depending on the appearance of the cleaning robot, the characteristics of the cleaning robot, the threshold-overcoming ability of the cleaning robot, and the characteristics of the cleaning space.

That is, the state determining unit 132 distinguishes whether the value of the floor sensor is due to the presence of a precipice or whether the value of the floor sensor is generated when the front side of the mobile robot is lifted to cross over an obstacle such a threshold using the three-dimensional angle information, and thus determines the current pose or the current operational state of the mobile robot.

The movement control unit 133 may perform an operation for avoiding a precipice or may control for crossing over an obstacle such as a threshold, in accordance with the estimation. As a specific method of operation for avoiding a precipice, the movement control unit 133 may use an existing published technique.

Further, as described above, when it is determined that the mobile robot is in the state of crossing over an obstacle such as a threshold, the movement control unit 133 momentarily ignores the value measured by the floor sensor (for example, for approximately 0.5 to 1 second) to allow the mobile robot to cross over the threshold without performing the operation for avoiding a precipice.

Here, "precipice" refers to a location where when a mobile robot such as a cleaning robot falls the mobile robot may be damaged, and may include high stairs.

The state determining unit 132 distinguishes whether the high measurement value of the floor sensor is caused by the presence of a precipice or by tilting of the mobile robot while crossing over an obstacle such as a threshold, and because the movement control unit 133 controls the mobile robot in accordance with the distinguished results, the mobile robot may easily cross over obstacles such as thresholds, and the height of obstacles such as thresholds which can be crossed by the mobile robot may be increased.

When it is discovered that the mobile robot is tilted to a side direction during movement, the state determining unit 132 may determine that there is an error in the position recognizing unit of the mobile robot. The position recognizing unit recognizes the position of the mobile robot. Specifically, the position recognizing unit photographs the ceiling to analyze feature points from the photographed images to recognize the position of the mobile robot.

Specifically, when the previously obtained three-dimensional angle of the mobile robot is inclined to any one axis during movement of the mobile robot, the state determining unit 132 may determine that there is error in the position recognition of the mobile robot.

Taking cleaning robots as an example, cleaning robots have a sensor such as a camera which is provided in the upper portion of the cleaning robot, and the position recognizing unit of the cleaning robot may recognize the cleaning robot's position using information obtained by photographing the ceiling using the sensor, such as a camera, and analyzing the photographed image.

However, when the cleaning robot moves with one wheel falling on the edge of a carpet or on a threshold, the cleaning robot may be tilted. When such tilting of the cleaning robot occurs, there may be error in the position recognition results of the cleaning robot determined by analyzing the information obtained by photographing the ceiling with a sensor such as a camera, which is provided in the upper portion of the cleaning robot.

FIG. 7 is a view illustrating a position recognition error incurred when a mobile robot is tilted.

As illustrated in FIG. 7, when a cleaning robot is tilted, the camera provided in the upper portion of the cleaning robot does not photograph the ceiling in a vertical direction, but photographs the ceiling in an inclined direction, through which a large error may be incurred. Such error may be increased as the height of the ceiling is increased. That is, the position of the ceiling recognized by the camera when the cleaning robot is not tilted but is horizontal is A, and the position of the cleaning robot is recognized using the point A1. However, when the cleaning robot is tilted at θ3, the camera mounted in the cleaning robot is also tilted, so that the point A2 may be recognized. When the position recognizing unit recognizes the position of the cleaning robot using the point A2, an error may be incurred. The error is corrected using θ3, and θ3 may be obtained by the state determining unit 132 according to the exemplary embodiment of the present invention.

Therefore, when a previously obtained three-dimensional gradient of the cleaning robot is tilted to one side or when the tilted state is maintained for a predetermined time or longer, the state determining unit 132 may determine that there may be an error incurred in the position recognition of the cleaning robot.

When the state determining unit 132 determines that there may be an error incurred in the position recognition of the cleaning robot, the movement control unit 133 may correct the position recognized by the position recognizing unit of the cleaning robot using the previously obtained three-dimensional gradient of the cleaning robot. In this case, the movement control unit 133 may correct the position of the cleaning robot using a trigonometric function.

In addition to the above-mentioned situation, the state determining unit 132 may determine various states of the mobile robot using the three-dimensional angle information, and the movement control unit 133 may perform control appropriate to the state so determined.

For example, when the three-dimensional angle is awry for a predetermined time or longer and it is determined that avoidance is required, the movement control unit 133 controls the mobile robot to perform an avoidance operation.

Further, in the case of mobile robots which generally move on a plane, the position may be recognized with five degrees of freedom including x, y, roll, pitch, and yaw. In the case of position recognition using six degrees of freedom, complexity of the position recognizing unit is increased so that it is not appropriate for use in a system having limited computation ability, such as an embedded system. The mobile robot according to the exemplary embodiment of the present invention may replace roll and pitch information, among five degrees of freedom, with the estimated angle information, and thus may more accurately recognize the position. Further, according to the exemplary embodiment of the present invention, even if the mobile robot is tilted, accurate position recognition is possible.

When accuracy of the yaw angle output of the gyro sensor 121 is lowered, a yaw estimation unit (not illustrated) may estimate the yaw angle using previously obtained three-dimensional angle information.

Specifically, in the cases of when an error is generated in the mobile robot, when there is user manipulation such as re-inserting a wet cloth into the cleaning robot, or when the mobile robot moves in a tilted state, accuracy of the yaw angle output of the gyro sensor 121 is lowered. When the accuracy of the yaw angle output is lowered, the yaw estimation unit may estimate the yaw angle using recently obtained three-dimensional angle information. When the yaw estimation unit estimates the yaw angle using recently obtained three-dimensional angle information, it helps to quickly and accurately recognize the position when the mobile robot resumes operation, and further helps various devices which employ the yaw angle information to generate accurate information and to improve control.

FIG. 8 is a view illustrating a method of determining the state of a mobile robot according to an exemplary embodiment of the present invention.

As illustrated in FIG. 8, the state determining unit 132, according to the exemplary embodiment of the present invention, estimates the three-dimensional angle of the mobile robot using information collected by the gyro sensor 121, which is connected to the mobile robot at step S810.

Next, the state determining unit 132 obtains the three-dimensional angle information of the mobile robot by filtering the three-dimensional angle estimated using information collected by the acceleration sensor 122 connected to the mobile robot at step S820.

In this case, the state determining unit 132 repeats the processes of estimating the three-dimensional angle to obtain the three-dimensional information (S810 and S820) at least two times in order to obtain more accurate three-dimensional angle information of the mobile robot.

Next, the state determining unit 132 determines the state of the mobile robot using the previously obtained three-dimensional angle information of the mobile robot at step S830.

In this case, the state of the mobile robot can be the pose of the mobile robot, whether correction of the position recognition of the mobile robot is required, a slope confinement state of the mobile robot, the operational state of the mobile robot, or the movement state of the mobile robot.

Thereafter, the movement control unit 133 controls the movement of the mobile robot based on the determined state of the mobile robot.

FIG. 9 is a view illustrating a detailed configuration of an IMU according to another exemplary embodiment of the present invention.

As illustrated in FIG. 1, the IMU 120, according to another exemplary embodiment of the present invention, further includes a correcting unit 123 in addition to the components of the IMU 120 according to the exemplary embodiment of the present invention which has been described with reference to FIG. 1.

Here, the correcting unit 123 may correct the bias value of the acceleration sensor 122. The correcting unit 123 is added so that the present invention may be used in various environments. For example, when the preconfigured bias value of the acceleration sensor 122 is changed due to various reasons such as a temperature or operation time, the correcting unit 123 may correct the bias value during operation of the mobile robot. In so doing, the present invention enables more accurate determination of the state and more accurate control of the mobile robot.

The bias value of the acceleration sensor 122 may be preconfigured. The preconfigured bias value of the acceleration sensor 122 may have error due to various factors such as the characteristics, temperature, or operation time of the chips installed in the sensor.

To take the triaxial acceleration sensor 122 as an example, when the mobile robot to which the acceleration sensor 122 is connected is stopped, there exists only gravitational acceleration, and thus the magnitude of the acceleration must be the value of gravitational acceleration (1G). That is, when the x-axis acceleration is $a_x$, the y-axis acceleration is $a_y$, and the z-axis acceleration is $a_z$, the magnitude, A, of the acceleration measured by the triaxial acceleration sensor 120 is $\sqrt{a_x^2+a_y^2+a_z^2}$ and A needs to be 9.8 m/s², which is gravitational acceleration (1G). However, A may have a different value from gravitational acceleration (1G) due to a bias error of the acceleration sensor 120.

If the bias error of the acceleration sensor 122 is not corrected, an error may also be incurred in the previously obtained three-dimensional angle information, and thus there may also be a problem in controlling the mobile robot, such as a cleaning robot.

In order to solve the above-mentioned problem, the correcting unit 123 may correct the bias value of the acceleration sensor 122 even during operation of the mobile robot. That is, the correction unit 123 may correct the bias value by distinguishing between when the mobile robot is moving and when the mobile robot is not moving.

As an example, the following is an explanation of the process by which the bias value is corrected by the correcting unit 123 when the mobile robot is moving.

In the case that the mobile robot is moving straight on a plane, the acceleration sensor 122 outputs values whose average is constant, in spite of the standard deviation. The correcting unit 123 applies the average to each axis output of the gyro sensor 121. The average may refer to the average of output values of the acceleration sensor 122 for the latest one to five seconds, while the mobile robot is moving straight on the plane. The amount of one to five seconds may vary depending on the characteristics of the acceleration sensor 122, the type of the acceleration sensor 122, the user configuration, or the configuration environment of the mobile robot.

In the case of the triaxial gyro sensor 121, the axes of the gyro sensor 121 are the x, y, and z axes, and thus the correcting unit 123 applies the average to the outputs of the x, y, and z axes of the gyro sensor 121.

When the recent angular velocity measured by the gyro sensor 121 is equal to or greater than a preconfigured reference, the correcting unit 123 re-performs the process of calculating the average. When the recent angular velocity measured by the gyro sensor 121 is equal to or greater than the preconfigured reference, Vw, the reason for which the correcting unit 123 re-performs the process of calculating the average is to determine whether there are too many or too few movement components included in the output data.

That is, in the case that the robot is not moving or has only one acceleration component, the standard deviation comes out low. When the standard deviation is approximately 0.1 deg/sec or lower, it may be determined that the mobile robot is stopped or moving slowly. That is, only when there are few movement components of the data output does the correcting unit 123 apply the average to the output of each axis of the gyro sensor 121. The correcting unit 123 applies the average to the output of each axis of the gyro sensor 121 only when there are few movement components of the data in order to improve the reliability of the bias correction. Here, the preconfigured reference (Vw) may be approximately 0.05 g, but may vary depending on various reasons such as the performance of the mobile robot, the purpose of the mobile robot, and the performance of the sensor.

Among the average values for each axis, the correcting unit 123 may correct the average of the x axis and the average of the y axis for bias. Further, among the axes, the correcting unit 123 may set the average of the z axis as the gravitational acceleration (1G). Whenever the gravitational acceleration (1G) is configured the values may differ, but it may be set to 9.8 m/s².

That is, the correcting unit 123 may determine whether the mobile robot is stopped using the movement average of the gyro sensor 121, and the movement average of the acceleration sensor 122 may be used to correct the bias.

As another example, the following is an explanation of the process by which the correcting unit 123 collects information for correcting the bias value of the acceleration sensor 122 when the mobile robot is not moving.

Even when the mobile robot is not moving, the correcting unit 123 may correct the bias value of the acceleration sensor 122 in a similar way as the example of when the mobile robot is moving.

To this end, the mobile robot may be configured to control to intentionally stop for approximately 0.5 to 1 second during operation. The time of 0.5 to 1 second may vary depending on the type or purpose of the mobile robot, the performance of the mobile robot, the performance of the acceleration sensor 122, the characteristics of the acceleration sensor 122, or the control algorithm of the mobile robot. Further, configuration of the control for intentionally stopping the mobile robot during operation can be set to stop the robot periodically or aperiodically according to the operation time, or to stop only under specific operation conditions. The configuration process will be described with respect to cleaning robots, which are an example of mobile robots.

FIG. 10 is a view illustrating an example in which a cleaning robot is configured to intentionally stop during operation.

As illustrated in FIG. 10, the cleaning route of a cleaning robot for cleaning is generally represented by a curved line (ⓐ). Within such a curved cleaning route, a circled section (ⓑ) where the cleaning robot changes direction occurs, and the cleaning robot may be controlled or configured to stop for a fixed time in this section (ⓑ).

As another example, the following is an explanation of the process by which the correcting unit 123 corrects the bias value of the acceleration sensor 122 when the mobile robot stops for a fixed time.

The correcting unit 123 may obtain an acceleration output value while the mobile robot is stopped. That is, the correcting unit 123 calculates the average in the case when the wheels of the mobile robot are stopped, there is no additional input from the user, and the angular velocity output of the gyro sensor 121 is equal to or less than the preconfigured reference (Vw).

When the mobile robot is not moving, the correcting unit 123 may correct the average of the x axis and the average of the y axis for bias, from among averages of the axes. Further, from among the averages of the axes, the correcting unit 123 may set the average of the z axis as the gravitational acceleration (1G).

The correcting unit 123 may use all the averages of the axes calculated for when the mobile robot is moving and when the mobile robot is not moving to correct the bias.

The reliability of the average calculated when the mobile robot is not moving is higher than the reliability of the average calculated when the mobile robot is moving. Therefore, the correcting unit 123 may set the weighted value of the average calculated when the mobile robot is not moving to be higher than the weighted value of the average calculated when the mobile robot is moving for correcting the bias.

FIG. 11 is a view illustrating the bias correcting process according to an exemplary embodiment of the present invention.

As illustrated in FIG. 11, the correcting unit, according to an exemplary embodiment of the present invention, may obtain the average (Avg) and standard deviation (Dev) of the sensor measurement values from the triaxial gyro sensor 121 and the triaxial acceleration sensor 122 for the latest one second at step S1110.

Next, the correcting unit 123 obtains the wheel encoder and recent wheel speed command information of the mobile robot and determines whether the mobile robot is moving using the obtained wheel encoder, the recent wheel speed commands, the average (Avg) of the sensor measurement values, and the standard deviation (Dev) of the sensor measurement values at step S1120.

For example, when the encoder is unchanged and the standard deviation (Dev) is lower than 0.1 degree/sec, the correcting unit 123 may determine that the mobile robot is stopped. Further, when the rotational component of the wheel encoder is equal to or less than 5 degrees/sec and the acceleration is not zero, the correcting unit 123 may determine that the mobile robot is moving straight. Further, in cases aside from when it is determined that the mobile robot is stopped or is moving straight, the correcting unit 123 does not distinguish the specific operation, but may determine that the mobile robot is in a state of movement (M). The state (M) when the mobile robot is in operation refers to a state when the mobile robot is performing another operation such as rotation, other than halting or straight movement of the mobile robot. The examples of numerical values such as one second, 0.1 degree/sec, or 5 degrees/sec may vary depending on various reasons such as the type of the mobile robot, the system environment of the mobile robot, the purpose of the mobile robot, or the performance of the mobile robot.

Next, according to the so-determined stopped, straight movement, or in operation (M) state of the mobile robot, the correcting unit 123 may set different weighted values (w).

For example, when the mobile robot is in an operational state (M), the correcting unit 123 sets the weighted value (w) to 0 at step S1130. Further, when the mobile robot is in a stopped state, the correcting unit 123 sets the weighted value (w) to 0.5 at step S1140. In addition, when the mobile robot is moving straight, the correcting unit 123 sets the weighted value (w) to be 0.05 at step S1150.

Next, the correcting unit 123 corrects the acceleration bias value using the average, standard deviation, and preconfigured weighted values of the measurement values obtained from the gyro sensor 121 and the acceleration sensor 122 at step S1160.

In this case, the correcting unit 123 may correct the bias value using Equation 6.

$$Bnew = Bold \times (1-w) + Avg \times w \quad \text{[Equation 6]}$$

In Equation 6 above, Bnew is the corrected bias value, Bold is the bias value before correction, w is the weighted value, and Avg is the average of the sensor measurement values.

Further, the correcting unit 123 may reset the average of the z axis to be the gravitational acceleration (1G).

The obstacle sensing unit 140 receives stereo image input from the wide angle camera 110 and may extract a preconfigured number of horizontal lines from the received stereo image. Here, the preconfigured number is at least two, and desirably three.

The obstacle sensing unit 140 performs dense stereo matching along the extracted horizontal lines and as a result may obtain distance information to obstacles.

FIG. 12 is a view illustrating the obstacle sensing process according to an exemplary embodiment of the present invention.

As illustrated in FIG. 12, the obstacle sensing unit 140 performs highly dense stereo matching based on the received left and right stereo images as illustrated in FIGS. 12A and 12B, and as a result may calculate the depth value. Here, in the image of FIG. 12C, the depth value calculated as described above is represented in grayscale. Further, FIG. 12C illustrates a linear region (L) which is used to sense the obstacle.

In this case, since it is impossible for the depth values for the entire region to be calculated by a mobile robot mounted with a small-sized processor, in the exemplary embodiment of the present invention, depth values are extracted only from a partial region.

The map creating unit 150 is provided with the current position information estimated by the position recognizing unit 131, reconstructs a pose graph based on the provided position information, and may update the previously stored key frame set based on the reconstructed pose graph. A map may be configured by the set of key frames.

The DB 160 stores the key frame set generated in accordance with movement of the mobile robot.

FIG. 13 is a view illustrating the method of recognizing the position of a mobile robot according to an exemplary embodiment of the present invention.

As illustrated in FIG. 13, when an apparatus for recognizing the position of the mobile robot (hereinafter referred to as a position recognizing apparatus), according to an exemplary embodiment of the present invention, receives stereo image input from the wide angle camera at step S1310, it extracts feature points from the input stereo image and continuously traces the extracted feature points by frame at step S1320.

Next, the position recognizing apparatus may remove moving objects from the stereo image at step S1330.

For example, the position recognizing apparatus compares the current frame and the last n-th frame, and as a result of the comparison removes inconsistent features which may be determined to be moving objects.

Next, the position recognizing apparatus performs visual odometry based on the traced feature points to obtain the first odometry information as the result at step S1340, and obtains the second odometry information through internal odometry, based on inertial information at step S1342.

Next, the position recognizing apparatus selects one type of odometry information from between the first odometry information and second odometry information obtained at step S1350, and uses the selected odometry information and pose information to predict the state information at step S1360.

In this case, the position recognizing apparatus selects the first odometry information when the first odometry information satisfies the predetermined conditions, and selects the second odometry information when the first odometry information does not satisfy the predetermined conditions.

Here, determining whether the predetermined conditions are satisfied refers to determining whether the odometry information, for example, the rate of change of the position information, is within the preconfigured threshold value.

Next, based on the predicted state information, the position recognizing apparatus searches a preconfigured number of adjacent key frames from among the previously stored key frame set at step S1370 and estimates the current position using the preconfigured number of adjacent key frames searched at step S1380.

In this case, the position may be estimated more accurately as the number of adjacent key frames increases.

The position recognizing apparatus, according to the exemplary embodiment, may be applied to autonomous cleaning robots or service robots. For example, the cleaning robot autonomously moves in indoor environments or outdoor environments. While running, the cleaning robot meets various obstacles such as walls, guardrails, desks, or furniture, and the autonomous cleaning robot uses its position in the cleaning area and the position of obstacles found to determine the driving route, along which it moves. According to the exemplary embodiment, the autonomous cleaning robot includes a stereo camera, specifically, a wide angle stereo camera, as an image capturing unit to obtain external images. Through the so-acquired external environmental information, especially the feature points related to edges, the autonomous cleaning robot is able to estimate its own position, determine the driving route, and thus move.

Specifically, in the case of cleaning robots which autonomously move based on simultaneous localization and map-building (SLAM), the exemplary embodiment may be used for the robot to estimate its own position on the constructed lattice map, to estimate the position of obstacles, to determine a movement route to avoid collision with the obstacles using the estimated position relationships, and to determine an optimal route.

In the exemplary embodiment, the odometry information may be data which is used to estimate the positional change of the mobile robot in accordance with time. For example, the odometry information may be information obtained from a wheel mounted on the mobile robot, or from rotary encoders in a legged joint. The state information, such as movement distance of the mobile robot or number of rotations of the wheel, may be calculated using the odometry information. Further, the space where the mobile robot is currently located may be understood through the state information, so that the odometry information may be used to determine the key frame during image processing.

The position recognition method according to the exemplary embodiment of the present invention may be implemented as computer readable software, and the software may be executed in a processor mounted in an autonomous cleaning robot.

Even though all components of the exemplary embodiment may be combined as one component or their operations may be combined, the present invention is not limited to the exemplary embodiment. In other words, if it is within the scope or purpose of the present invention, one or more of all of the components may be selectively combined for operation. Further, all of the components may be implemented as one independent hardware, but a part or all of the components may be selectively combined to be implemented as a computer program which includes a program module which performs a part or all of functions combined in one or plural hardwares. Further, such a computer program may be stored in a computer readable media such as a USB memory drive, CD disk, or flash memory to be read and executed by a computer for implementation of the exemplary embodiment of the present invention. The storage media of the computer program may include media such as magnetic recording media, optical recording media, and carrier wave media.

The exemplary embodiments of the present invention which have been described above are examples, and it is obvious to those skilled in the art that various changes or modifications may be made without departing from the spirit and scope of the present invention. Therefore, the exemplary embodiments of the present invention are provided for illustrative purposes only and are not intended to limit the technical spirit of the present invention, and the scope of the technical concept of the present invention is not limited thereto. The protective scope of the present invention should be construed based on the following claims, and all the technical concepts in the equivalent scope thereof should be construed as falling within the scope of the present invention.

What is claimed is:

1. A mobile robot comprising:
   a camera system;
   at least one processor; and
   a non-transitory computer-readable medium storing instructions that, when executed by the at least one processor, cause the mobile robot to
      obtain first odometry information based on a stereo image obtained by the camera system,
      obtain second odometry information based on inertial information,
      select one of the first odometry information and the second odometry information based on one or more conditions being met,
      predict a movement point based on the selected one of the first odometry information and the second odometry information,
      estimate a current position of the mobile robot using the predicted movement point and a previously stored key frame, and
      control movement of the mobile robot based on the estimated current position.

2. The mobile robot of claim 1, wherein the camera system comprises a plurality of wide angle cameras positioned on the robot to obtain the stereo image, and
   wherein the non-transitory computer-readable medium further stores instructions that, when executed by the at least one processor, cause the mobile robot to process the stereo image to have a predetermined size, encode the processed stereo image using a binary robust independent elementary features (BRIEF) binary descriptor to generate binary data, and compare the generated binary data and data indicating an absolute position of the mobile robot in a previously stored key frame to recognize the current position of the mobile robot.

3. The mobile robot of claim 1, wherein the first odometry information is selected when the first odometry information satisfies a predetermined condition and the second odometry information is selected when the first odometry information does not satisfy the predetermined condition.

4. The mobile robot of claim 1, wherein the non-transitory computer-readable medium further stores instructions that, when executed by the at least one processor, cause the mobile robot to search for at least one key frame adjacent to the predicted movement point among a previously stored key frame set based on the predicted movement point and estimate the current position of the mobile robot using at least one searched adjacent key frame.

5. The mobile robot of claim 1, wherein the non-transitory computer-readable medium further stores instructions that, when executed by the at least one processor, cause the mobile robot to extract a predetermined number of horizontal lines in the stereo image and perform stereo alignment along the extracted horizontal lines to obtain distance information to an obstacle.

6. The mobile robot of claim 1,
   wherein the non-transitory computer-readable medium further stores instructions that, when executed by the at least one processor, cause the mobile robot to reconstruct a pose graph based on current position information of the mobile robot and update the previously stored key frame based on the reconstructed pose graph.

7. The mobile robot of claim 1, wherein the non-transitory computer-readable medium further stores instructions that, when executed by the at least one processor, cause the mobile robot to obtain a three-dimensional angle of the mobile robot based on the inertial information and determines a state of the mobile robot using the obtained three-dimensional angle of the mobile robot, and control movement of the mobile robot based on the estimated position and the determined state.

8. The mobile robot of claim 7, wherein the non-transitory computer-readable medium further stores instructions that, when executed by the at least one processor, cause the mobile robot to determine that an orientation of the mobile robot is confined within a slope when the obtained three-dimensional angle of the mobile robot is maintained at a specific angle for at least a predetermined time, and determine that the mobile robot is about to overcome an obstacle when the obtained three-dimensional angle of the mobile robot is equal to or larger than the predetermined angle or has changed more than a predetermined amount.

9. The mobile robot of claim 7, wherein the non-transitory computer-readable medium further stores instructions that, when executed by the at least one processor, cause the mobile robot to determine that an error in position recognition of the mobile robot has occurred when a three-dimensional angle of the mobile robot obtained during the movement of the mobile robot has a gradient in a side direction.

10. The mobile robot of claim 1, wherein the non-transitory computer-readable medium further stores instructions that, when executed by the at least one processor, cause the mobile robot to calculate an average movement value of the mobile robot for an x-axis, a y-axis, and a z-axis and correct a bias value of an acceleration sensor based on the calculated average movement value of the x-axis, the y-axis, and the z-axis when the mobile robot operates at an angular velocity of a gyro sensor which is equal to or greater than a predetermined angular velocity.

11. A method for controlling a mobile robot, the method comprising:
    obtaining first odometry information based on a stereo image obtained by a camera system mounted on the mobile robot;
    obtain second odometry information based on inertial information for the mobile robot;
    select one of the first odometry information and the second odometry information based on one or more predetermined conditions being met;
    predict a movement point based on the selected one of the first odometry information and the second odometry information;
    estimate a current position of the mobile robot using the predicted movement point and a previously stored key frame; and
    control movement of the mobile robot based on the estimated current position.

12. The method of claim 11, further comprising:
    processing the stereo image to have a predetermined size;
    encoding the processed stereo image using a binary robust independent elementary features (BRIEF) binary descriptor to generate binary data; and
    comparing the generated binary data and data indicating an absolute position of the mobile robot in a previously stored key frame to recognize the current position of the mobile robot.

13. The method of claim 11, further comprising selecting the first odometry information when the first odometry information satisfies the predetermined condition and selecting the second odometry information when the first odometry information does not satisfy the predetermined condition.

14. The method of claim 11, further comprising:
    searching for at least one key frame adjacent to the predicted movement point among a previously stored key frame set based on the predicted movement point; and
    estimating the current position of the mobile robot using at least one searched adjacent key frame.

15. The method of claim 11, further comprising:
    extracting a predetermined number of horizontal lines in the stereo image; and
    performing stereo alignment along the extracted horizontal lines to obtain distance information to an obstacle.

16. The method of claim 11, further comprising:
    reconstructing a pose graph based on current position information of the mobile robot; and
    updating the previously stored key frame based on the reconstructed pose graph.

17. The method of claim 11, further comprising:
    obtaining a three-dimensional angle of the mobile robot based on the inertial information;
    determining a state of the mobile robot using the obtained three-dimensional angle of the mobile robot; and
    controlling movement of the mobile robot based on the estimated position and the determined state.

18. The method of claim 17, wherein when the obtained three-dimensional angle of the mobile robot is maintained at a specific angle for at least a predetermined time, the method further comprises determining that an orientation of the mobile robot is confined within a slope, and when the obtained three-dimensional angle of the mobile robot is equal to or larger than the predetermined angle or has changed more than a predetermined amount, the method further comprises determining that the mobile robot is about to overcome an obstacle.

19. The method of claim 17, wherein when a three-dimensional angle of the mobile robot obtained during the movement of the mobile robot has a gradient in a side direction, the method further comprises determining that an error in position recognition of the mobile robot has occurred.

20. The method of claim 11, wherein when the mobile robot operates at an angular velocity of a gyro sensor which is equal to or greater than an angular velocity, the method further comprises calculating an average movement value of the mobile robot for an x-axis, a y-axis, and a z-axis and correcting a bias value of an acceleration sensor based on the calculated average movement value of the x-axis, the y-axis, and the z-axis.

* * * * *